United States Patent [19]

Adams et al.

[11] 3,964,700

[45] June 22, 1976

[54] AIRDROP CANISTER

[75] Inventors: Gary V. Adams; Roy T. Minert, both of Brigham City, Utah

[73] Assignee: Thiokol Corporation, Newtown, Pa.

[22] Filed: Aug. 26, 1974

[21] Appl. No.: 500,413

[52] U.S. Cl.............................. 244/138 R; 102/35.6
[51] Int. Cl.².......................................... B64D 1/02
[58] Field of Search................ 102/34.1, 35.6, 37.1; 244/138, 150; 220/316, 323

[56] References Cited
UNITED STATES PATENTS

| | | | |
|---|---|---|---|
| 2,501,559 | 3/1950 | Winzen et al....................... | 244/150 |
| 2,772,809 | 12/1956 | Ross.................................... | 220/323 |
| 2,882,115 | 4/1959 | Lindenschmidt.................... | 220/316 |
| 3,593,664 | 7/1971 | Davis et al......................... | 102/35.6 |

*Primary Examiner*—Verlin R. Pendegrass
*Attorney, Agent, or Firm*—Stanley A. Marcus; Edward E. McCullough

[57] ABSTRACT

An elongated, cylindrical case has an intermediate partition dividing it into a canister and a housing. A parachute is attached into the housing with deployment means releasable by a timer. After a predetermined time has elapsed, the timer withdraws radial pawls to release an end cap from the housing, allowing the parachute to be deployed. The canister is equipped with a special end cap capable of hermetically sealing the canister so that it may convey any of a variety of cargo via airdrop. This end cap is essentially a cylinder, recessed at both ends. A disk is held adjacent the inner end of the cylinder by a center post that passes through central holes in the cylinder by the disk and is pivoted to a plurality of radial pawls that may be extended or withdrawn by rotation of the center post, so that they may engage a shoulder in the end of the canister. The center post is equipped with means for locking it in one position so that the end cap cannot be removed by accident from the canister.

7 Claims, 3 Drawing Figures

AIRDROP CANISTER

CROSS-REFERENCE TO RELATED APPLICATIONS

This invention is related to that described in a patent application owned by the same assignee titled, "Aerial Flare and Parachute Deployment Means Therefor," Ser. No. 787,079; filed Dec. 26, 1968; now U.S. Pat. No. 3,593,664; by Willard F. Davis, Roger A. Grosgebauer, Gary V. Adams, and Raymond DeGroshe.

BACKGROUND OF THE INVENTION

This invention relates broadly to airdrop vehicles, especially to those incorporating sealable canisters that may be launched from aircraft.

Occasionally, it is necessary or desirable under battlefield conditions to convey documents, electronic components, and other items to ground troops via aircraft. Previously this has been done simply by attaching a parachute to the packaged item and dropping it near or in the target area. This system had a number of disadvantages in that the items being dropped were in danger of being damaged by moisture or other inhospitable conditions. Also, deployment of the parachute had to be initiated manually, which introduced danger of damage to the item being dropped and to the launching aircraft, especially if the aircraft were traveling at high speeds, as is common in military situations.

SUMMARY OF THE INVENTION

The present invention, which satisfies this need for a means of safely airdropping cargo from high speed military aircraft, is actually a modified illuminating flare. Hence, it incorporates the added bonus feature of being launchable by means of the same equipment used for launching flares. This obviates the danger of damage to the cargo and to the aircraft, since this technology for launching flares is well developed and known in the art.

The type of flare that is modified to achieve the present invention is described in detail in the U.S. patent cited above U.S. Pat. No. 3,593,664). As shown in this patent, an elongated, cylindrical case is divided by an intermediate partition into a flare case and a housing that contains the parachute, the parachute deployment means, and a mechanical timer for releasing the parachute deployment means. These items are confined in the housing by an end cap that is also released by the timer after a predetermined time period has elapsed.

In the present invention, the flare candle is eliminated from the flare case, as is the ignition means therefor; and the empty flare case is closed by a special, hermetically sealable end cap.

This end cap is essentially a cylinder, recessed at both ends. A center post passes through holes in the cylinder and in a disk that is held adjacent the inner end of the cylinder by the center post. A radial flange on the center post is confined in the inner recess of the cylinder by the disk. Radial pawls, pivoted to the flange are extensible and retractable by rotating the center post, so that they may engage a shoulder in the end of the flare case. The center post is equipped with a pivotally-attached lever having a T-bar on the end thereof for rotating the center post and withdrawing the end cap from the flare case —which now becomes a canister for containing cargo to be airdropped. The lever has a slot that may be fitted over a stud in the outer recess of the cylinder for preventing accidental rotation of the center post. A means for maintaining the lever on the stud is also included. An O-Ring seal surrounds the cylinder for hermetically sealing the canister.

Objects of the invention are to provide a means for accurately airdropping cargo from high speed aircraft and to provide such a means that may be launched from the same equipment used on aircraft for launching flares, to take advantage of the existing and highly refined flare technology. Important features of the invention are that it may be easily and inexpensively manufactured by modifying existing items of demonstrated reliability.

Other objects and advantages of the invention may be noted as the following detailed description is read with reference to the accompanying drawings, wherein the same parts are designated by the same numerals throughout the disclosure.

DESCRIPTION OF THE PREFERRED EMBODIMENTS

Figure 1:
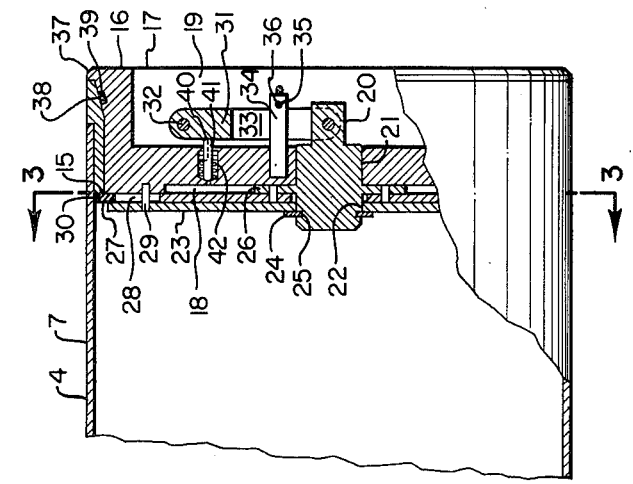
FIG. 1 is a longitudinal, sectional view of the invention.

As shown in FIG. 1, an elongated, cylindrical case 4 is divided by an intermediate partition 5 into a housing 6 and a canister 7. The parachute 8 is attached by lanyards 9 to the partition 5 and is packaged in the housing 6. A compression spring 10 is loosely engaged to the top portion of the parachute 8 and is confined in a compressed position by a unitary timer 11 and end cap 12. A plug knob 13 inserted into the timer 11 serves the dual purpose of setting a time period that must elapse before deployment of the parachute 8 and of actuating the timer 11. The latter function is accomplished by manually removing the plug knob 13. The timer allows inwardly spring-biased, radial pawls 14 to withdraw from engagement with a shoulder 15 on the inside of the end portion of the housing 6. This releases the end cap 12 and the spring 10, which thereupon deploys the parachute 8. All of these items and means of operation are identical to those described in the patent cited above and are set forth in detail therein.

The canister 7 has a shoulder 15 inside the end portion thereof, which may be engaged by the canister end cap 16. This end cap 16 is essentially a short cylinder 17, recessed at both ends to form an inner recess 18 and an outer recess 19. A center post 20 passes through a central hole 21 in the cylinder 17 and a hole 22 in the disk 23 that is held adjacent the inner end of the cylinder 17 by a snap ring 24 fitted in a groove 25 on the inner end of the post 20. A radially extending flange 26 is confined in the inner recess 18 by the disk 23. In this preferred embodiment, three, equally spaced, radially extending pawls are each pivotally attached to the flange 26. Each pawl 27 has a slot 28 that fits over a guide pin 29 fixed to the disk 23. Slots 30 are formed in the inner end of the cylinder by notches therein adjacent a disk 23. By rotating the center post 20, the pawls 27 may be extended through the slots 30 to engage shoulder 15, or they may be withdrawn therefrom by rotating a center post 20 in the opposite direction.

A lever 31, pivoted to the outer end of the center post 20, provides a means for rotating the post 20. A T-bar 32 fixed to the outer end of the lever 31 provides a means for withdrawing the end cap 16 from the canister 7, when the pawls 27 have been retracted. The lever 31 has a slot 33 that may be fitted over a stud 34 in the outer recess 19 of the cylinder 17, so that the center post 20 may be locked in a given position, i.e., with the pawls 27 extended to engage the shoulder 15. A pin or clip 35 may be passed through a hole 36 in the stud 34 to maintain the lever 31 on the stud 34.

An outwardly-extended flange 37 on the outer end of the cylinder 17 limits motion of the end cap 16 in the canister 7.

An elastomeric O-Ring seal 38 is seated in a groove 39 surrounding the cylinder 17 for creating a gastight seal with the canister 7 when the end cap 16 is engaged therewith. A small pressure-relief valve 40 having an actuation arm 41 is seated in a duct 42 in the cylinder 17, so that the arm 41 may be engaged by the lever 31 to maintain the valve 40 in a closed position when the lever 31 is down. The valve 40 is automatically opened when the lever 31 is raised. This feature facilitates removal of the end cap 16 from the canister 7, since air pressure at ground level, being greater than the ambient pressure at the high altitude launch site, would otherwise tend to make removal of the end cap difficult.

Figure 2:
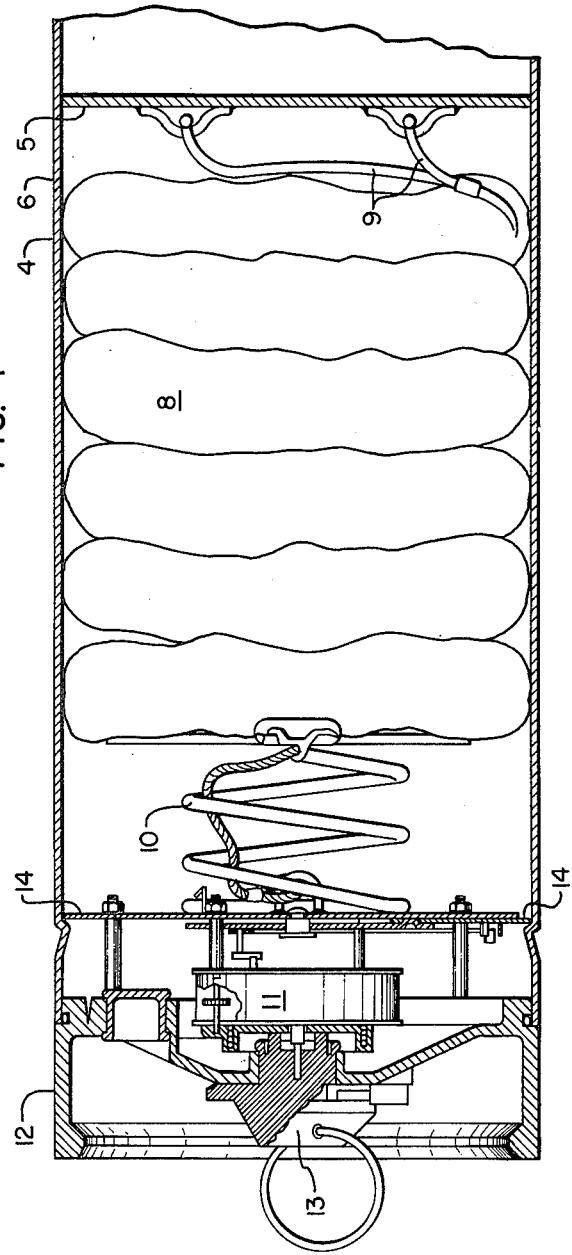
FIG. 2 is an end view of the canister end cap.
Figure 3:
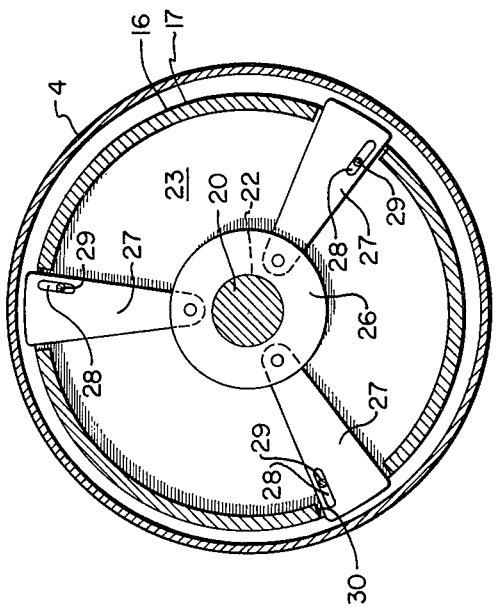
FIG. 3 is a cross section taken on line 3-3 of FIG. 1.

As shown in FIG. 2, counterclockwise rotation of the center post 20 extends the radial pawls 27 to engage the shoulder 15 inside the end portion of the canister 7 when cargo, not shown, is to be enclosed in the canister. After the canister 7 has been launched from the aircraft by well known procedures for launching flares, the end cap may be disengaged by removing the pin 35, raising the lever 31 from the stud 34, and rotating the center post 20 in a clockwise direction to retract the pawls 27 from the shoulder 15. The T-bar 32 is then manually grasped to withdraw the end cap 16 from the canister 7, whereupon the contents may be removed.

An invention has been described that constitutes an advance in the art of airdropping cargo. Although the preferred embodiments have been described in exact detail, it should be noted that many such details may be altered without departing from the scope of the invention as it is defined in the following claims.

The invention claimed is:

1. An airdrop canister comprising:
   a cylindrical case having an intermediate partition therein that divides the case into a housing and a canister;
   a parachute in the housing and attached thereto;
   means for deploying the parachute;
   a timer in the housing, operatively connected to the means for deploying the parachute so that the parachute may be deployed thereby after a predetermined time interval;
   an end cap engageable to the housing for retaining the contents therein; and
   a removable end cap on the canister that creates a hermetic seal therewith; and
   a pressure relief valve in the canister end cap, in communication with the interior of the canister and operable from outside the end cap, whereby air pressure on both sides of the end cap may be equalized to facilitate removal thereof.

2. The airdrop canister of claim 1, wherein the canister end cap comprises:
   a cylinder, recessed at both ends to form an inner recess and an outer recess, having a central hole, and having an outwardly-extending flange on its outer end to limit movement of the cylinder into the canister;
   a centrally apertured disk adjacent the inner end of the cylinder;
   a central post extending through the holes in the cylinder and disk; and having an annular flange confined by the disk in the inner recess of the cylinder;
   a plurality of radial pawls, each pivoted at one end to the disk, and extensible through a slot formed by one of a plurality of notches in the inner end of the cylinder adjacent the disk; and
   guide pins on the disk, each extending through a slot in one of the pawls, whereby movement of the pawls may be controlled so that by rotating the post, they may be extended beyond the diameter of the cylinder and retracted.

3. The airdrop canister of claim 2 further including:
   means for rotating the post; and
   means for locking it in one position.

4. The airdrop canister of claim 3 wherein the means for rotating the post is a slotted lever pivoted at one end to the outer end of the post; and the means for locking it in one position includes a stud fixed in the outer recess of the cylinder so that the lever may be placed upon the stud, with the stud extending through the slot therein; and further including removable means for retaining the lever on the stud.

5. The airdrop canister of claim 4 further including a T-bar on the end of the lever to facilitate removal of the end cap from the canister.

6. The airdrop canister of claim 1 further including a gastight seal between the canister and its end cap.

7. An airdrop canister comprising:
   a cylindrical case having an intermediate partition therein that divides the case into a housing and a canister;
   a parachute in the housing, attached therein;
   a compression spring releasably engaging the top of the parachute;
   an end cap confining the spring and parachute in the housing and including radially-extensible, spring-retractable pawls that may engage a shoulder in the end of the housing for retaining the end cap therein;
   a timer attached to the end cap and arranged to release the pawls after a predetermined time period has elapsed so that they may retract to release the end cap from the housing, whereby the released spring becomes a deployment means for extracting the parachute from the housing;
   a removable plug knob that engages the timer for setting the time period for release of the pawls; and
   a canister end cap comprising: a cylinder, recessed at both ends to form an inner recess and an outer recess, having a central hole, and having an outwardly-extending flange to limit movement of the cylinder into the canister; a disk adjacent the inner end of the cylinder and having a central hole; a central post extending through the holes in the cylinder and disk, and having an outwardly-extending flange confined by the disk in the inner recess of the cylinder; a plurality of radial pawls, each pivoted to the disk and extensible through a slot between the inner end of the cylinder and the disk; guide pins on the disk, each extending through a slot in a corresponding one of the pawls, whereby the pawls may be extended through the slots in the cylinder to engage a shoulder inside the end of the canister and may be withdrawn therefrom by rotating the center post; a slotted lever pivoted at one end to the outer end of the post; a stud fixed in the outer recess of the cylinder so that the lever may be placed with the stud extending through the slot therein, whereby rotation of the post may be prevented; a pin that may be passed through a hole in the stud to retain the lever thereon; a T-bar on the end of the lever to facilitate removal of the end cap from the canister; an elastomeric seal seated in a groove around the cylinder for creating a gastight seal with the canister; a pressure relief valve in communication with the inner and outer recesses of the canister end cap for equalizing pressures therein; and a snap ring seated in a groove on the center post for retaining the disk thereon.

* * * * *